(12) United States Patent
Farooq et al.

(10) Patent No.: US 9,340,434 B2
(45) Date of Patent: May 17, 2016

(54) RECOVERY OF NICKEL FROM INDUSTRIAL PICKLING ACID SOLUTIONS

(75) Inventors: Robina Farooq, Lahore (PK); Saleem Farooq Shaukat, Lahore (PK)

(73) Assignee: COMSATS INSTITUTE OF INFORMATION TECHNOLOGY, Lahore (PK)

(*) Notice: Subject to any disclaimer, the term of this patent is extended or adjusted under 35 U.S.C. 154(b) by 0 days.

(21) Appl. No.: 13/049,843

(22) Filed: Mar. 16, 2011

(65) Prior Publication Data

US 2011/0162976 A1 Jul. 7, 2011

Related U.S. Application Data

(63) Continuation-in-part of application No. 11/953,035, filed on Dec. 8, 2007.

(51) Int. Cl.
| | |
|---|---|
| C02F 1/36 | (2006.01) |
| C02F 1/461 | (2006.01) |
| C02F 1/467 | (2006.01) |
| C02F 1/66 | (2006.01) |
| C02F 101/20 | (2006.01) |

(52) U.S. Cl.
CPC ............... C02F 1/36 (2013.01); C02F 1/4678 (2013.01); *C02F 1/66* (2013.01); *C02F 2001/46142* (2013.01); *C02F 2101/20* (2013.01); *C02F 2201/4617* (2013.01)

(58) Field of Classification Search
CPC ........ C02F 1/36; C02F 2101/20; C02F 1/461; C02F 1/46104

USPC ......... 205/261, 263, 264, 265, 271, 272, 291, 205/292, 299, 320, 742, 759, 760, 761, 771
See application file for complete search history.

(56) References Cited

U.S. PATENT DOCUMENTS

| | | | |
|---|---|---|---|
| 3,577,334 A | 5/1971 | Graham et al. | |
| 3,650,925 A * | 3/1972 | Carlson | 205/562 |
| 3,755,113 A | 8/1973 | Entshev et al. | 205/341 |
| 3,899,405 A | 8/1975 | Iverson et al. | |
| 4,028,199 A | 6/1977 | Holland | |
| 4,155,821 A | 5/1979 | Grontoft | |
| 4,235,695 A * | 11/1980 | de Nora et al. | 204/268 |
| 4,310,395 A | 1/1982 | Huss et al. | |
| 4,640,746 A | 2/1987 | Nobel et al. | |
| 5,217,585 A * | 6/1993 | Snyder et al. | 205/589 |
| 5,302,278 A | 4/1994 | Nobel et al. | |
| 5,690,806 A * | 11/1997 | Sunderland et al. | 204/294 |
| 6,746,590 B2 * | 6/2004 | Zhang et al. | 205/137 |

(Continued)

FOREIGN PATENT DOCUMENTS

JP 59-75691 4/1984

OTHER PUBLICATIONS

C. Huang. "Effect of surfactants on recovery of nickel plating wastewater by electrowinning." Water Research. Aug. 1995. vol. 29, Issue 8. pp. 1821-1826.*

(Continued)

*Primary Examiner* — Steven A. Friday
(74) *Attorney, Agent, or Firm* — H.C. Park & Associates, PLC

(57) ABSTRACT

Nickel is recovered from pickling acid solutions of crude ore using boric acid as catalyst by ultrasound assisted electrolysis.

5 Claims, 1 Drawing Sheet

(56) References Cited

U.S. PATENT DOCUMENTS

| | | | |
|---|---|---|---|
| 6,835,294 | B2 | 12/2004 | Tsuchida et al. |
| 2002/0027083 | A1 | 3/2002 | Fritz-Langhals |
| 2003/0042145 | A1 | 3/2003 | Zhang et al. |
| 2003/0070934 | A1 | 4/2003 | Cobley et al. |
| 2003/0196901 | A1 | 10/2003 | Grunes |
| 2006/0243595 | A1 | 11/2006 | Henuset et al. |
| 2009/0145774 | A1* | 6/2009 | Farooq et al. ............ 205/771 |

OTHER PUBLICATIONS

G. Cushnie. "Electrowinning in pollution prevention and control technology for plating operations." NCMS/INAMF Pollution Control Assessment. 1994. pp. 117-138.*

R. Farooq, Y. Wang, F. Lin, S. Shaukat, J. Donaldson, A. Chouhdary. "Effect of ultrasound on the removal of copper from the model solutions for copper electrolysis process." Water Research. Jul. 2002. vol. 36, Issue 12. pp. 3165-3169.*

Parkinson, Ron. "Nickel plating and electroforming: Essential industries for today and the future." Nickel Development Institute. Jun. 2001.*

Kern, E. F. and Fabian, F.G. "Electrodeposition of Nickel." Dec. 1908. Electrochemical and Metallurgical Industry: A monthly journal of electrochemistry and chemical and metallurgical engineering. vol. VI. pp. 365.*

Graves, B. "Nickel Plating Primer" Products Finishing. Apr. 1, 2001. <http://www.pfonline.com/articles/nickel-plating-primer> Accessed Mar. 2016.*

Lupi et al., "Studies concerning nickel electrowinning from acidic and alkaline electrolytes," Minerals Engineering, vol. 19, Issue 12, Jun. 8, 2006, pp. 1246-1250, Elsevier.

Fornari et al., "Copper and nickel selective recovery by electrowinning from electronic and galvanic industrial solutions," Hydrometallurgy, vol. 52, Issue 3, Jun. 1999, pp. 209-222, Elsevier.

Orhan et al., "Nickel recovery from the rinse waters of plating baths," Hydrometallurgy, vol. 65, Issue 1, Jul. 2002, pp. 1-8, Elsevier.

Sirajuddin et al., "Electrolytic Recovery of Nickel from Industrial Hydrogenated Vegetable Oil (Ghee) Waste," Acta Chim. Slov., vol. 51, Jan. 2004, pp. 793-798.

Cognet et al., "Ultrasound in organic electrosynthesis," Ultrasonics Sonochemistry vol. 7, Issue 4, Oct. 2000, pp. 163-167, Elsevier.

Compton et al., "Dual activation: coupling ultrasound to electrochemistry—an overview," Electrochimica Acta, vol. 42, No. 19, Jan. 1997, pp. 2919-2927, Elsevier Science Ltd., Great Britain.

Klima et al., "Sonoelectrochemistry: Effects of ultrasound on voltammetric measurements at a solid electrode," Journal of Electroanalytical Chemistry, vol. 367, Jan. 1994, pp. 297-300.

Lamminen et al., "Mechanisms and factors influencing the ultrasonic cleaning of particle-fouled ceramic membranes," Journal of Membrane Science, vol. 237, Issue 1-2, Jul. 1, 2004, pp. 213-223, Elsevier.

Mason et al., "Ultrasonic intensification of chemical processing and related operations: A Review," Transactions of IChemE, Jul. 1996, pp. 511-516, vol. 74, Part A.

Mettin et al., "Bubble size distributions and structures in acoustic cavitation," Proc. 2nd Conf. on Applications of Power Ultrasound in Physical and Chemical Processing, 1999, pp. 125-129, Toulouse, France.

"Revised National Environmental Quality Standards (NEQS)", Dec. 1999, Pakistan.

Wadhawan et al., "Emulsion electrosynthesis in the presence of power ultrasound Biphasic Kolbe coupling processes at platinum and boron-doped diamond electrodes," Journal of Electroanalytical Chemistry, vol. 507, Issue 1-2, Jul. 13, 2001, pp. 135-143.

Walton et al., "Sonoelectrochemistry," Advances in Sonochemistry, vol. 4, 1996, pp. 205-284, JAI Press Inc.

"Guidelines for Drinking-Water Quality," World Health Organization, 1984, pp. 184-187, Geneva, Switzerland.

Non-Final Office Action issued on Sep. 1, 2011 in U.S. Appl. No. 11/953,035.

Cunningham et al., "Environmental Science," McGraw Hill, International Edition, 2007, pp. 399-405.

Sawyer et al., "Chemistry for Environmental Engineering and Science," McGraw Hill, First Edition, 2003, pp. 718-723.

Andrew et al., "Standard Methods for the examination of water and wastewater," American Public Health Association, American Water Works Association and Water Environment Federation, 21st Edition, 2005, pp. 3-15.

Walker, R., "Ultrasonic Agitation in Metal Finishing," Advances in Sonochemistry (ed. By T. J. Mason), 1993, pp. 125-145, vol. 3, JAI Press, London.

Nathaniel H., "The effect of voltage on copper electroplating," Science Project 2005, Wayback Machine Capture form Dec. 2005, Retrieved from <http://web.archive.org/web/20051204040433/http://www.selah.k12.wa.us/SOAR/SciProj2005/NathanielH.html>.

Final Office Action issued on Feb. 12, 2015 in U.S. Appl. No. 11/953,035.

Walker, R. "Ultrasound improves electrolytic recovery of metals." Ultrasonics Sonochemistry. Jan. 1997. pp. 39-43, vol. 4, Issue 1.

González-Garcia, J.; Escapez, M.D.; Bonete, P.; Hernández, Y. V.; Garretón, L.G.; and Sáez, V. "Current topics on sonoelectrochemistry." Ultrasonics. Sep. 29, 2009. vol. 50, Issue 2. pp. 318-322.

Lou, H.H. and Huang, Y. "Elecroplating." Encyclopedia of Chemical Processing. Sep. 1, 2006 capture of <http://chem1.eng.wayne.edu/~yhuang/Papers/Book_Piating_ECHP.pdf> using Wayback Machine Internet Archive.

Non Final Office Action issued on Apr. 23, 2015, in U.S. Appl. No. 11/953,035.

Final Office Action dated Oct. 28, 2015, in U.S. Appl. No. 11/953,035.

Non-Final Office Action dated Feb. 18, 2016, in U.S. Appl. No. 11/953,035.

* cited by examiner

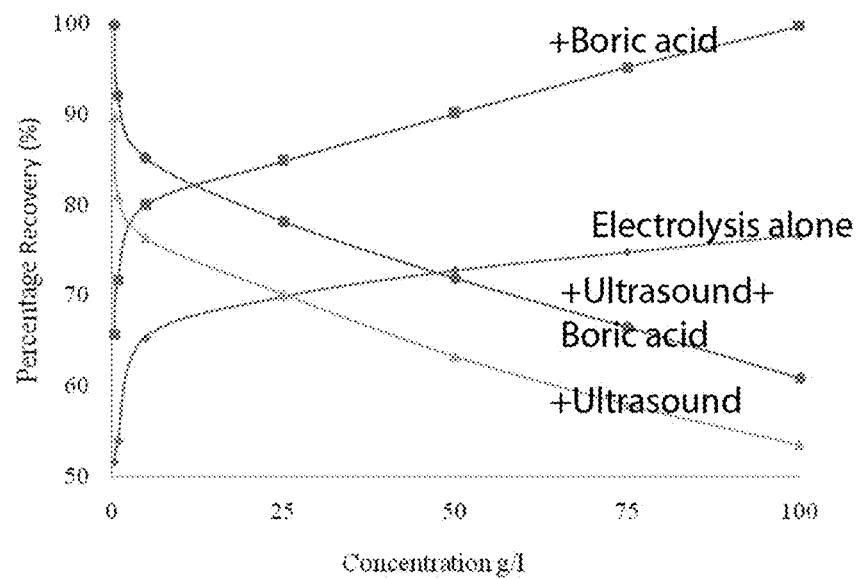

RECOVERY OF NICKEL FROM INDUSTRIAL PICKLING ACID SOLUTIONS

CROSS REFERENCE TO RELATED APPLICATION

This application is a continuation-in-part of U.S. patent application Ser. No. 11/953,035, filed on Dec. 8, 2007, which is hereby incorporated by reference for all purposes as if fully set forth herein.

BACKGROUND

1. Field

Exemplary embodiments of the present disclosure relate to recovery of nickel from industrial pickling acid solutions.

2. Discussion

Water pollutants poison drinking water, food, and/or animals through buildup of environmental toxins in animal tissues, upsets the biological diversity of river and lake ecosystems, causes acid rain deforestation, and lots of other problems. Most of these problems are contaminant specific. Among water pollutants, the most notorious kinds of pollutants are metals. Many metals such as nickel, mercury, lead, cadmium and tin are highly toxic in minute concentrations. As metals are highly persistent, they can accumulate in food webs and have a cumulative effect in top predators including humans.

Although, nickel appears to be of lower toxicity in humans, there is some evidence that inhaled nickel may be carcinogenic. Nickel enters in soil and water from the wastewater generated in electroplating, metallurgical operations, rinse water from different industrial operations, etc. During the metallurgic extraction of nickel, pickling acid solutions are used which contain high concentration of nickel and need immediate attention. The large amount of nickel in waste pickling acid solution goes to waste. During the extraction process, about 100 g/l nickel is wasted and millions of dollars are spent for disposing it of properly. By using the process reported in the instant invention, substantial savings could be generated from the recovery of nickel as well reduced cost of its disposition.

The removal of metals from water is the most important need of the day because it can reduce the cost of metal recovery, reduce water pollution and thus reduce the health hazards of pollution with metals, which may include diseases like cancer, metal toxicity, kidney disorders, etc. Different methods for the nickel recovery and removal have been reported.

SUMMARY

The instant invention is based on the methods to recover nickel from metals pickling acid solutions and thus reduce or eliminate the metal toxicity from the environment. This method of instant invention is based on the ultrasound assisted electrolysis process that can remove heavy metals without using additional chemicals.

A method to remove lead by sono-electrolysis process having different concentrations of lead, pH conditions, voltage, electrode distances, electrode types, electrode material has been reported in U.S. patent application Ser. No. 11/953,035, which is included in the instant invention by reference in its entirety. The instant invention discloses a novel method for the recovery of nickel from pickling acid solutions of nickel industry by electrolysis in the presence of carbon electrodes, catalyst boric acid and ultrasonic waves. The main advantage for end users is that nickel is easily scratched in the form of metal layers or that carbon cathodes can be burnt to recover nickel.

This method of instant invention discloses specific conditions for the recovery of nickel. The technique of electrolysis is coupled with ultrasound and specific concentration of boric acid is required as a catalyst enhancing significantly and surprisingly the efficiency of electrolysis, use of carbon electrodes facilitating the easy removal of nickel from the surface of electrodes and thus substantially reducing the cost of recovery.

In the instant invention, the recovery of nickel is improved by more than 200% as compared to the customary electrolysis processes. Therefore, this invention brings a surprisingly higher cost-effectiveness in the recovery of nickel from waste products.

The key elements of the instant invention include:

- Two carbon electrodes are used instead of steel electrodes. Carbon electrodes are found to be better for the recovery of metals from its surface by scratching or burning. Secondly, these have a lower cost.
- Boric acid is used for making a complex to form a weak nickel borate complex, $Ni(H_2BO_3)_2$ which acts as a homogeneous catalyst to reduce the over-potential for nickel deposition.
- The pH was 2-3 and is used without any adjustments.
- The voltage is very critical and is kept constant at 3.3V.
- The best recovery is observed by keeping the electrodes at 3 cm apart.
- The recovery of nickel is compared between simple electro deposition, electro deposition in the presence and absence of boric acid and ultrasound.

BRIEF DESCRIPTION OF DRAWING

FIG. 1 illustrates a percentage recovery of nickel using carbon electrodes after 3 hours of electrolysis at 60° C. and pH 2.5.

DETAILED DESCRIPTION

The model instrument for the recovery of nickel is designed by ultrasound-assisted electrolysis for the recovery of nickel from model pickling acid solution. It consists of four major components, i.e., ultrasonic bath, poly(methyl methacrylate) vessel, power supply and carbon electrodes. Nickel Chloride ($NiCl_2.6H_2O$) having the concentration of Nickel 0.5-100 g/l may be used. The potential on the electrodes was kept at 3.3V as this was adjusted after trial and error. The height, width and length of electrolytic bath are 12.8 cm, 12.8 cm and 24.4 cm, respectively. The volume of the vessel is adjusted according to the ultrasonic bath. The ultrasonic bath [Ultrasonic Bath Digital, Model: WUC-D1OH. Daihan Scientific, Korea], having transducers which emit ultrasonic frequency of 40 KHz is used. The power supply utilized in this work is FINE TECH, Model-SFH1000, Korea. The thermostat built in the ultrasonic bath controls the temperature. Two carbon electrodes are kept at the distance of 3.0 cm apart. The boric acid and nickel chloride concentrations are kept at the ratio of 1:8. The amount of metal recovered is determined by taking the initial and final weights of electrodes. The concentration of nickel in solutions is determined by atomic absorption spectrometer according to the prescribed method.

The average concentration of nickel in pickling acid solution is 100 g/l. The experiments are conducted at different concentrations i.e., 0.5, 1, 5, 25, 50, 75 and 100 g/l. FIG. 1 shows the comparison of different combinations e.g., electrolysis, boric acid assisted electrolysis, ultrasound assisted electrolysis, boric acid and ultrasound assisted electrolysis.

The results showed that the use of boric acid during the electrolysis of nickel chloride has resulted 23.2% increase in recovery of nickel over simple electrolysis process in 100 g/l solution. Boric acid is used in order to prevent precipitation of nickel hydroxide on the cathode. Boric acid is also used to overcome the hydrogen gas reduction. It is evident that boric acid forms a weak nickel borate complex, $Ni(H_2BO_3)_2$, which acts as a homogeneous catalyst to reduce the over-potential for nickel deposition reaction.

FIG. 1 shows the percentage recovery with different combinations after three hours of electrolysis at 60° C. and pH 2.5. It is observed that ultrasound assisted electrolysis in the presence of boric acid (ultrasound+boric acid+electrolysis) at low concentration (less than 5 g/l) resulted in 85.2-99.9% recovery of nickel. However, the percentage recovery decreases with the increase of concentration. It is also found that electrolysis in the presence of boric acid (boric acid+electrolysis) at high concentration (more than 5 g/l) resulted in 84.8-99.8% recovery of nickel. It is evident that ultrasound assists the movement of ions towards cathode by cavitations when the concentration is low. However, at high concentrations, the increased number of ions themselves reaches on the surface of electrodes. As the number of ions increases, their chances to reach the cathode increase. The ions at high concentration have to travel less distance before deposition as compared to ions in low concentration. The enhanced percentage recovery by ultrasound-assisted electrolysis is due to many reasons. Firstly, ultrasonic degassing at cathode surface prevents gas bubble accumulation interfering with the passage of current. This results in the continuous cleaning and activation of the cathode. Secondly, agitation (via cavitations) at the cathode surface assists ion transport across the cathode double layer, throughout the electrochemical process and reduces ion depletion in the layer. Therefore, ultrasound shows the significant reduction of the thickness of the Nerst diffusion layer at the surface of an immersed cathode, although the layer cannot be removed completely. It is observed that ultrasound agitation has not only increased the percentage recovery but it has also improved the mechanical and physical properties of the deposited metals. The deposits produced with the ultrasound are also more compact with less porosity and are harder as compared to stagnant conditions.

It is concluded that at low concentrations (0.5-5 g/l), ultrasound assisted electrolysis in the presence of boric acid is very efficient to recover nickel. At high concentration (5-100 g/l), simple electrolysis with boric acid is able to recover nickel efficiently.

It is observed that average recovery of nickel is improved by 200.20% (Table 1) as compared to the simple electrolysis process. Therefore, this process has brought a cost effective and innovative solution for industries, which are extracting nickel from ores.

TABLE 1

The percentage increase of recovery of nickel by ultrasound assisted electrolysis over electrolysis

| Time (minutes) | Electrolysis | Electrolysis + Ultrasound + Boric Acid | % Increase |
|---|---|---|---|
| 45 | 10.4 | 31.19 | 199.90 |
| 90 | 22.6 | 67.9 | 200.44 |
| 180 | 33.3 | 99.99 | 200.27 |

Note:
Initial Concentration = 0.5 g/l, pH = 2.5 T = 60° C.

Effect of Temperature

The temperature of electrolyte was varied from 20° C. to 60° C. to examine the effect of temperature. It is observed that in the absence of ultrasound, increased temperature leads to higher recovery of nickel (Table 2). In simple electrolysis, in the presence of boric acid, the percentage recovery is increased from 14% to 51.6%. It shows that the increase of temperature from 20° C. to 60° C., there is 37.6% increase in recovery. However, in ultrasound-assisted electrolysis, in the presence of boric acid, there is 41.7% increase in percentage recovery by increasing temperature. At higher temperature, the mobility of ions increased and the viscosity of solution decreased leading to higher transfer of nickel ions from bulk of solution to the cathode surface. Therefore the percentage recovery is increased.

TABLE 2

Effect of temperature on percentage recovery of nickel

| Temperature (° C.) | Electrolysis | Electrolysis + Boric acid | Electrolysis + Ultrasound | Electrolysis + Ultrasound + Boric Acid |
|---|---|---|---|---|
| | | Recovery of Nickel (%) | | |
| 20 | 14 | 24 | 80 | 89 |
| 30 | 24 | 34 | 82 | 91.9 |
| 40 | 33 | 44 | 85 | 94.7 |
| 50 | 42 | 55 | 87.5 | 97.5 |
| 60 | 51.6 | 65.7 | 89.7 | 99.9 |

Note:
Initial Concentration = 0.5 g/l, pH = 2.5, Time = 3 h

At 20° C., ultrasound and boric acid assisted electrolysis showed 89% recovery, which is 65% higher than simple electrolysis process. However, this effect is reduced in experiments with ultrasound. In the presence of ultrasound, degasification is increased at high temperature. As gas molecules help to produce cavitations. The decrease in gas concentration at high temperature is resulted the decrease in cavitations, which in turn has affected the percentage recovery at high temperature. The mobility of ions is increased at high temperature, but this increase is suppressed by degasification phenomenon during sonication. Therefore, it is concluded that ultrasound can work better for the recovery of nickel at low temperature.

Energy Consumption

The electrolytic recovery of nickel is carried out at 3.3V. It is observed that high cell voltage leads to another electrolytic process that is hydrogen evolution at the cathode. Hydrogen evolution seriously decreases the deposition of nickel at cathode. While at low voltage, the current efficiency decreases leading to lower recovery rate of nickel. Therefore, the most efficient recovery of nickel was found to be 3.3V.

The ultrasound and boric acid assisted electrolysis is a cost effective process over simple electrolysis process in terms of energy consumption (Table 3). However, the amount of energy consumed is increased with the increase in concentration. It shows that the novel combination of ultrasound, boric acid and electrolysis work efficiently at low concentrations.

TABLE 3

Energy consumption process during recovery of nickel

| Concentration g/l | Electrolysis | Electrolysis + Ultrasound + Boric Acid |
|---|---|---|
| 0.5 | 83.99 | 43.38 |
| 1 | 40.20 | 23.52 |
| 5 | 6.63 | 5.08 |
| 25 | 1.24 | 1.108 |
| 50 | 0.59 | 0.56 |
| 75 | 0.38 | 0.32 |
| 100 | 0.28 | 0.25 |

Note:
pH = 2.5, T = 60° C.

The invention claimed is:

1. A method, comprising:

receiving wastewater comprising nickel chloride at a concentration between 0.5 g/l and 5.0 g/l in an electrolysis chamber comprising a carbon cathode and a carbon anode;

mixing the wastewater with boric acid to form a solution, wherein a ratio of a concentration of boric acid to a concentration of nickel chloride in the formed solution is 1 to 8 to form a weak nickel borate complex $Ni(H_2BO_3)_2$;

electrolyzing the solution in the electrolysis chamber with the solution at 60° C. and a voltage difference of 3.3 V across the carbon cathode and the carbon anode;

applying an ultrasound wave at 40 KHz to the solution for transferring nickel ions from the solution to the carbon cathode; and removing the nickel from the solution, wherein applying the ultrasonic wave comprises reducing a Nerst diffusion layer at a surface of the carbon cathode by the ultrasonic wave.

2. The method of claim 1, wherein removing the nickel from the solution comprises removing the nickel from the carbon cathode.

3. The method of claim 1, wherein removing the nickel from the solution comprises burning the carbon cathode.

4. The method of claim 1, wherein:

The carbon cathode and carbon anode are spaced apart by a distance of 3.0 cm.

5. The method of claim 1, wherein a pH of the solution is in a range of 2 to 3.

* * * * *